United States Patent [19]

Redden

[11] 4,291,757

[45] Sep. 29, 1981

[54] MULTIPLE HEAT PUMP AND HEAT BALANCING SYSTEM FOR MULTI-STAGE MATERIAL PROCESSING

[75] Inventor: George H. Redden, Staunton, Va.

[73] Assignee: Westinghouse Electric Corp., Pittsburgh, Pa.

[21] Appl. No.: 153,991

[22] Filed: May 28, 1980

[51] Int. Cl.³ ............................................. F28D 7/00
[52] U.S. Cl. ............................. 165/104.31; 62/238.6; 62/335; 202/180
[58] Field of Search ................ 62/79, 175, 335, 238.5, 62/238.6, 324.4; 202/177, 180; 203/19, 24, 25, 26; 165/104 S, 63

[56] References Cited

U.S. PATENT DOCUMENTS

| | | | |
|---|---|---|---|
| 1,969,187 | 8/1934 | Schutt | 62/238.5 X |
| 2,320,853 | 6/1943 | Delahanty | 202/180 |
| 2,453,823 | 11/1948 | Williams | 62/79 |
| 3,322,188 | 5/1967 | Ostrander | 165/2 |
| 3,404,537 | 10/1968 | Leonard, Jr. | 203/25 X |
| 3,733,845 | 5/1973 | Lieberman | 62/335 |
| 4,165,037 | 8/1979 | McCarson | 62/238.6 X |

Primary Examiner—William E. Tapolcai, Jr.
Attorney, Agent, or Firm—E. C. Arenz

[57] ABSTRACT

For a material processing operation having at least one stage requiring heating and at least one stage requiring cooling, heating is provided by a first heat pump 24 and cooling is provided by a second heat pump 26, with two storage tanks of different temperatures 60 and 62 being provided, the second tank 62 serving as a heat sink for the condensing section 42 of the second heat pump, and serving as a heat source for the evaporator section 38 of the first heat pump, the first tank 60 providing a cooler fluid for the condenser section 42 of the second heat pump, and receiving a cooled fluid from the evaporator section 38 of the first heat pump.

7 Claims, 1 Drawing Figure

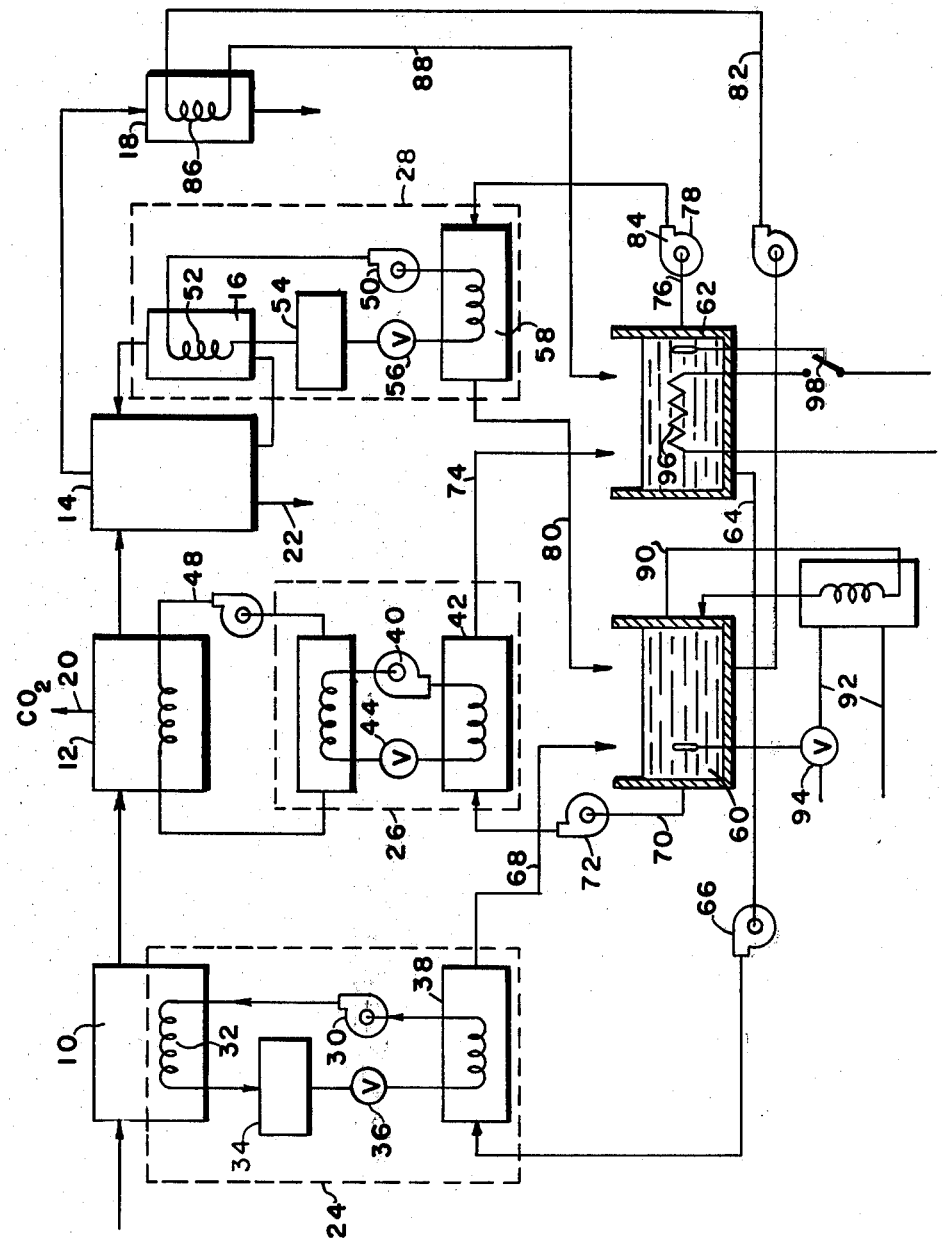

MULTIPLE HEAT PUMP AND HEAT BALANCING SYSTEM FOR MULTI-STAGE MATERIAL PROCESSING

BACKGROUND OF THE INVENTION

The invention pertains to the art of providing heating and cooling with heat pumps to a number of stages in a material processing operation.

In some material processing plants, such as an ethyl alcohol plant for example, heating is required in some stages while cooling is required in others. Most of the heat has typically been obtained in the form of steam from a boiler while more limited amounts of heat at points requiring such limited amounts may be obtained from an electrical source. The cooling is typically provided by cooling water which may originate from a cooling tower, pond or well.

It is the aim of this invention to provide a heating and cooling system with a heat balance arrangement in which some of the typical sources noted above can be eliminated or reduced.

SUMMARY OF THE INVENTION

In accordance with the invention, a number of heat pumps are provided in connection with a number of stages of material processing, at least one heat pump operating to provide heat to a stage while another heat pump operates to provide cooling, the system including at least a first and second tank or reservoir of fluid, the fluid from the warmer tank being passed to the evaporator section of the heat pump providing heating and then back to the cooler tank, while the fluid from the cooler tank is passed to the condenser section of the heat pump providing cooling and then back to the warmer tank.

In a processing operation such as an ethyl alcohol plant in which additional heating is required for an additional stage, a third heat pump is provided with its evaporator section in heat exchange relation with the fluid from the warmer tank and returning the fluid to the cooler tank.

BRIEF DESCRIPTION OF THE DRAWING

The single FIGURE is a simplified schematic illustrating the system of the invention as applied to the main elements of an ethyl alcohol plant.

DESCRIPTION OF THE PREFERRED EMBODIMENT

In the drawing only the major stages of a material processing operation in which heating is required in at least one stage and cooling is required in at least another stage is shown, it being understood that certain minor stages are omitted.

The ethyl alcohol plant, which will be used as one example of the type of plant in which material processing is carried out in a way to which the invention is applicable, includes a cooking stage 10 which requires heating, a cooling-fermentation stage 12 which requires cooling, a distillation stage 14 which also requires heating obtained from the reboiler 16, and a condensation stage 18 which also requires cooling. Of course, the material being processed is a mash which is passed to the various stages and transformed, the passage of the material being indicated by the solid line arrows into the successive stages. The release of $CO_2$ from the fermentation stage is indicated by the arrow 20, while the separation of stillage from the distillation stage is indicated by the arrow 22.

A first, second, and third heat pump comprised of the elements within the dashline rectangles 24, 26, and 28, respectively, provide the major part of the heating and cooling for the plant in accordance with the invention.

The first heat pump 24 includes a refrigerant compressor 30, a condensing section 32 in heat exchange relation with the cooker 10, a liquid receiver 34, an expansion device 36, and an evaporator section 38, with these elements of the refrigeration system being connected as shown.

The second heat pump includes refrigerant compressor 40, condensing section 42, expansion device 44, evaporator section 46, and the connecting lines as shown, the evaporator section being in heat exchange relation with the cooling-fermentation stage through fluid passed through the evaporator section and loop 48 to the cooling-fermentation stage as indicated by the solid line loop.

The third heat exchanger includes refrigerant compressor 50, condensing section 52 in the reboiler 16, receiver 54, expansion device 56, and evaporator section 58 with the connecting refrigerant lines as shown.

The system also contains a first fluid reservoir or tank 60 and a second fluid reservoir or tank 62, the temperatures in the tanks under normal operating conditions being somewhat higher in the second tank than in the first tank. The reason for this will become apparent from the following description of the connections from the tanks to the heat pumps and the heat balancing obtained therefrom. The fluid is carried from the second tank through line 64 by pump 66 and is passed through the evaporator section 38 of the first heat pump where the fluid is cooled, and is then passed back through line 68 to the lower temperature first tank.

Lower temperature fluid from the first tank is carried therefrom by line 70 and pump 72 to the condenser section 42 of the second heat pump, where the fluid is warmed thereby, and is then returned through line 74 to the second tank 62 which contains fluid of the higher temperature.

Higher temperature fluid from the second tank 62 is also carried through line 76 by pump 78 to the evaporator 58 of the third heat pump, where the fluid is cooled thereby, the fluid returning through line 80 to the lower temperature first tank 60.

Finally to provide cooling for the condensation stage 18, the fluid from the first tank 60 is carried through line 82 by pump 84 and passed in heat exchange relation with the condensation stage as indicated at 86, the fluid being warmed thereby and then returned through line 88 to the second tank 62.

Since there may be operating or other conditions in which the temperature in the fluid of the first tank exceeds that which is desirable, that is, that the fluid should be cooler, means is provided for removing heat from the fluid in communication with the first tank. While this may be accomplished in various ways, the illustrated example shows a loop 90 in communication with the tank, with the fluid being adapted be cooled by a water system 92, with the water flow being controlled in accordance with the fluid temperature through a thermostatically controlled valve 94.

Conversely, the fluid in the warmer second tank 62 may require additional heat, and an example of one means for accomplishing this is the provision of an electrical resistance heating element 96 thermostatically controlled by switch 98.

While not to be considered as in any way limiting, typical temperatures provided by the heating and cooling balance system may typically be as follows. In the first heat pump, hot gas at, say, 225° F. (107° C.) is passed through the cooking stage and condensed to a liquid at substantially the same temperature. Fluid from the second tank at 140° F. (60° C.) is passed through the evaporator section 38 and is cooled to 130° F. (54° C.) and returned to the first tank which will typically contain fluid at about 130° F. (54° C.).

In the second stage, fluid in the loop 48 is increased in temperature from 60° F. (16° C.) to 70° F. (21° C.) in its passage through the cooling-fermentation stage 12, this fluid then being cooled back down to 60° F. (16° C.) by the evaporator section 46. The 130° F. (54° C.) fluid from the first tank is warmed by the condenser section 42 to 140° F. (60° C.) and then returned to the second tank.

In the third heat pump, 140° F. (60° C.) fluid from the second tank is cooled by the evaporator section 58 to say 130° F. (54° C.) and returned to the first tank. The hot gas passed to the reboiler 16 at, say, 225° F. (107° C.) is condensed to a liquid of substantially the same temperature.

Finally, 130° F. (54° C.) fluid from the first tank is passed through the condensation section 18 and is warmed thereby to 140° F. (60° C.) and returned to the second and warmer tank 62.

It should be apparent from the foregoing description that the unique ability of heat pumps to effectively amplify the temperature of lower level heat and thus supply it to those stages in material processing requiring heat, coupled with the second heat pump functioning to provide cooling for a stage and rejecting heat to the second and warmer tank, along with the use of the two tanks at different temperatures in the heat balancing system provides an advantageous arrangement which can be capable of being less expensive initially, have lower operating costs, and result in the elimination or reduction of various of the prior art devices used in heating and cooling such as boilers, boiler houses, and cooling towers.

I claim:

1. For an arrangement in which material processing is carried out in several stages and in which heating of material is required in at least one stage, and the cooling of material in at least one other stage, a heating and cooling, and heat balancing system comprising:
    at least two heat pumps, a first of which operates in a heating mode, and a second of which operates in a cooling mode;
    said first heat pump having a condensing section in heat exchange relation with the means of a first stage in which heating of said material takes place, and also having an evaporator section;
    said second heat pump having an evaporator section in heat exchange relation with the means of the second stage in which cooling of said material takes place, and also having a condensing section;
    at least a first and a second fluid tank;
    means connecting the first tank to carry fluid therefrom to said condenser section of said second heat pump and to receive fluid from said evaporator section of said first heat pump;
    means connecting the second tank to carry fluid to said evaporator section of said first heat pump and to receive fluid from said condenser section of said second heat pump;
    said second tank thereby functioning as a heat sink to which heat from said condenser section of said heat pump is rejected, and also functioning as the heat source for which heat is drawn by said evaporator section of said first heat pump;
    said first tank thereby functioning to receive fluid from which heat has been withdrawn by said evaporator of said first heat pump and to discharge the received fluid to said condenser section of said second heat pump to receive fluid therein, the fluid in said first tank having a lower temperature then the fluid in said second tank under normal operating conditions.
2. The system of claim 1 including supplemental means for removing heat from the fluid communicating with the first tank in accordance with temperatures of said fluid being in excess of a predetermined value.
3. The system according to claim 2 including supplemental means for adding heat to the fluid communicating with said second tank in accordance with temperatures of said fluid being below a predetermined value.
4. For an arrangement including a third stage in which heating of material is required, the system of claims 1, 2, or 3 including:
    a third heat pump having a condensing section in heat exchange relation with the means of said third stage in which heating takes place, and also having an evaporator section;
    means connecting said second tank to carry fluid therefrom to said evaporator section of said third heat pump;
    means connecting said third heat pump evaporator section to carry fluid therefrom to said first tank.
5. For an arrangement including a fourth stage in which cooling of material is required, the system of claim 4 including:
    means connecting said first tank to carry fluid therefrom to said fourth stage and to return fluid from said fourth stage to said second tank.
6. In an arrangement for providing heating and cooling in various stages of an ethyl alcohol plant including at least the main stages of cooking, cooling-fermentation, and distillation, a heating and cooling and heat balance system comprising:
    first, second, and third heat pumps, each including a condensing section and an evaporating section;
    a first, normally cooler fluid tank, and a second, normally warmer fluid tank;
    means connecting the condensing sections of said first and third heat pumps in heat exchange relation with said cooking and distillation stages, respectively;
    means connecting the evaporator section of said second heat pump in heat exchange relation with the cooling-fermentation stage;
    means connecting said evaporator section of said first heat pump to receive fluid from said second tank and to return it to said first tank;
    means connecting said condensing section of said second heat pump to receive fluid from said first tank and return it to said second tank;
    means connecting said evaporator section of said third heat pump to receive fluid from said second tank and to return it to said first tank;

means to reject heat selectively from the fluid of said first tank, and to add heat selectively to said fluid of said second tank.

7. A system according to claim 6 wherein said plant includes an alcohol condensing section, and including: means for supplying fluid from said first tank to said condensing stage in heat exchange relation therewith and returning said fluid therefrom to said second tank.

* * * * *